(12) United States Patent
Meyer

(10) Patent No.: US 6,220,584 B1
(45) Date of Patent: Apr. 24, 2001

(54) HYDRAULICALLY DAMPING ENGINE BEARING

(75) Inventor: Heinrich Meyer, Königswinter (DE)

(73) Assignee: Mannesmann Boge GmbH, Bonn (DE)

( * ) Notice: Subject to any disclaimer, the term of this patent is extended or adjusted under 35 U.S.C. 154(b) by 0 days.

(21) Appl. No.: 09/275,343

(22) Filed: Mar. 24, 1999

(30) Foreign Application Priority Data

Mar. 24, 1998 (DE) .............................................. 198 12 837

(51) Int. Cl.[7] ................................................... F16F 13/26
(52) U.S. Cl. ...................................... 267/140.13; 207/219
(58) Field of Search ........................ 267/140.11–140.15, 267/219, 292, 294

(56) References Cited

U.S. PATENT DOCUMENTS

| | | | | |
|---|---|---|---|---|
| 4,765,601 | * | 8/1988 | Miller et al. ....................... | 267/140.1 |
| 4,828,234 | * | 5/1989 | Hoyer et al. ....................... | 267/140.1 |
| 5,205,546 | * | 4/1993 | Schisler ............................ | 267/140.13 |
| 5,228,663 | * | 7/1993 | Adler et al. ....................... | 267/140.14 |
| 5,280,886 | * | 1/1994 | Gartner et al. .................... | 267/140.13 |
| 5,386,977 | * | 2/1995 | Quast ............................... | 267/140.13 |
| 5,401,008 | * | 3/1995 | Winkler et al. ................... | 267/140.13 |
| 6,082,718 | * | 7/2000 | Yamada et al. ................... | 267/140.14 |

FOREIGN PATENT DOCUMENTS

WO96/17184 * 6/1996 (WO) .

* cited by examiner

*Primary Examiner*—Robert J Oberleitner
*Assistant Examiner*—Bradley King
(74) *Attorney, Agent, or Firm*—Cohen, Pontani, Lieberman & Pavane

(57) ABSTRACT

A hydraulically damping engine bearing having fluid-filled chambers bordered at least partially by elastic walls, a limitedly deflectable diaphragm separating the chambers, and at least one channel connecting the chambers. A bearing spring rate characteristic is adjustable by an arrangement that includes an additional suspension spring arranged outside of one of the chambers. An intermediate space is bordered by the suspension spring together with an outer wall of one of the chambers. A valve, in communication with the intermediate space, enables the space to be aerated and de-aerated.

11 Claims, 2 Drawing Sheets

HYDRAULICALLY DAMPING ENGINE BEARING

BACKGROUND OF THE INVENTION

1. Field of the Invention

The present invention relates to an engine bearing, and in particular to a hydraulically damping engine bearing including fluid-filled chambers bordered at least partially by elastic walls, a limitedly deflectable diaphragm separating the chambers and at least one channel connecting the chambers.

2. Description of the Related Art

Engine bearings are known (e.g., German reference DE 34 46 725 C2) in which a separating wall is arranged between two chambers, where one chamber has an elastic diaphragm running in annular fashion on a rigid outer wall. An intermediate space formed by the elastic diaphragm and the rigid outer wall can be pressurized with an underpressure or vacuum to attain high rigidity of the engine bearing. If, during driving operation, the engine bearing is to be placed in the high rigidity state, it is necessary to apply the underpressure in the intermediate space so that the elastic wall thereby lies directly on the rigid outer wall of the bearing.

Further, engine bearings are known (e.g., German reference DE 42 38 752 C1) in which the chambers separated by a diaphragm are equipped with a flexible wall arranged in one of the chambers, for the purpose of changing the bearing characteristic. The bearing characteristic is changed by virtue of the fact that at low rigidity of the bearing, at least one of the hydraulic chambers works against a gas volume enclosed in the intermediate space, whereas at high rigidity, the flexible wall comes at least partially to rest on a stop. To aerate the intermediate space, a switch opens a flow connection to atmosphere or a pressure storage device, while to de-aerate, a valve is arranged in the flow connection. In a configuration of this type, the flexible wall is an integral part of a complete rubber bearing.

In addition, rubber bearings are known (e.g., German references DE 41 14 879 A1, DE 41 20 841 C1, DE 41 30 362 C2 and DE 41 03 028 C2) that are configured so that their rigidity is controllable. These rubber bearings are similar to conventional bearings, however, auxiliary energy in the form of pneumatic pressure or hydraulic pressure is required. FIG. 4 in German reference DE 41 30 362 C2 shows a bearing equipped with a mechanical adjustment device.

Also known (e.g., PCT reference WO 96/17184), is a hydraulically damping engine bearing with a conventional suspension spring connected in series. However, the conventional suspension spring is taken out of operation in the high rigidity position. Disadvantageously, an expensive switching module is required. Moreover, auxiliary energy in the form of pressure is also required.

SUMMARY OF THE INVENTION

Accordingly, it is an object therefore of the present invention to provide a hydraulically damping engine bearing that is controllable and that isolates engine vibrations, especially in idle operation, and whereby an additional switchable reduction in static and dynamic rigidity levels is ensured.

To attain this object, the present invention provides a hydraulically damping engine bearing, including; fluid-filled chambers; elastic walls at least partially bordering the chambers, a limitedly deflectable diaphragm separating the chambers, and a channel in communication with the chambers. An additional suspension spring arranged outside of one of the chambers. An intermediate space, defined by the additional suspension spring and an outer wall of the chamber, is aerated and de-aerated by use of a valve.

In an advantageous embodiment of the present invention, the additional suspension spring is relatively soft and is connected in series to a modern conventional hydraulically damping engine bearing. Series-produced engine bearings are used as the engine bearing. The additional suspension spring is associated with a bearing cover, so that an intermediate space is formed between an outer surface of the bearing cover and an inner surface of the additional suspension spring. The additional suspension spring is equipped with an attachment part for attachment in a vehicle. This embodiment allows production of switchable or adaptive engine bearings that have a comparatively simple structure.

According to another embodiment of the present invention, the additional suspension spring has a different Shore hardness than a Shore hardness of the elastic wall of the chambers.

It is advantageous that, in a further embodiment of the present invention, a serial connection is used to connect the engine bearing to the additional suspension spring. This effectively produces a soft total spring rate in the axial and radial directions. Furthermore, the serial connection achieves a frequency-independent reduction of the spring rates of the total system.

In yet another embodiment of the present invention, the additional suspension spring is prestressed. A stop is provided to limit the spring path of the additional suspension spring. The axial deflection of the additional suspension spring is limited in one direction by the rigid bordering wall of a chamber and in the other direction by the stop.

In still another embodiment of the present invention, the additional suspension spring, in an unloaded state of the total system, is prestressed by the stop so that under the influence of a static load, the suspension spring assumes a position inside the stop and the rigid bordering wall. Advantageously, the suspension spring assumes a central position between the stop and the rigid bordering wall.

In still another embodiment of the present invention, the stop is configured as a cup-shaped element which is securely connected to the engine bearing.

According to a further embodiment of the present invention, the valve is configured as a non-return valve. In this embodiment the additional suspension spring is also deflected by tensile and pressure movements of the engine bearings. Therefore, the intermediate space is pumped empty via the non-return valve and by the pumping work of the additional spring. Such an engine bearing advantageously requires no additional energy, e.g., pressurized air or hydraulic fluid.

In yet a further embodiment of the present invention, the valve is externally controllable, preferably being configured as a magnetic valve.

In an additional embodiment of the present invention, a flow connection is provided between the valve and the intermediate space. Preferably, the flow connection is arranged so as to run through the additional suspension spring.

And in still another embodiment of the present invention, when the additional suspension spring rests on the rigid bordering wall, the spring rate of the total system corresponds approximately to the spring rate characteristic of the engine bearing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals designate similar elements throughout the drawings.

DETAILED DESCRIPTION OF THE PREFERRED EMBODIMENTS

Figure 1:
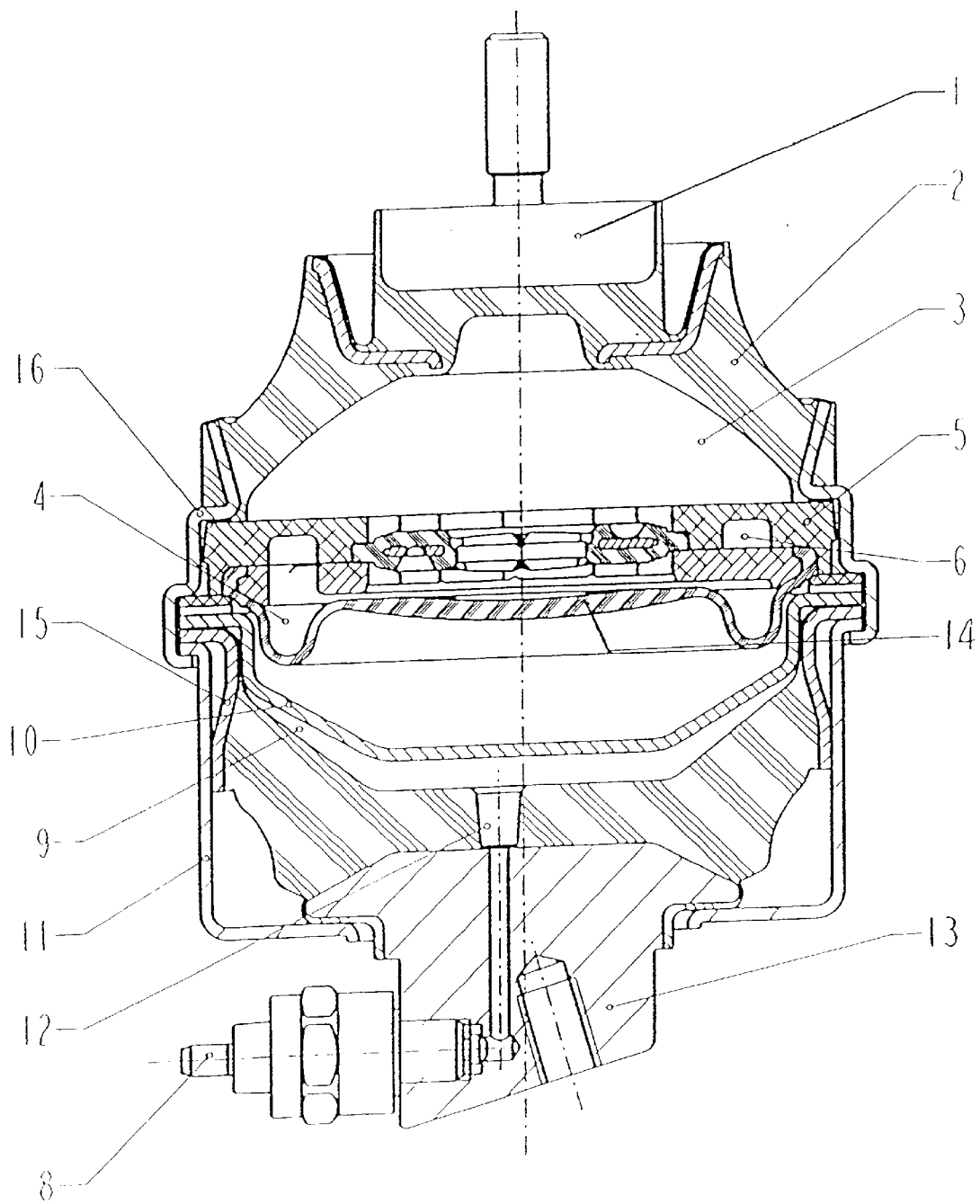
FIG. 1 shows a sectional view of an engine bearing with an additional suspension spring and a valve, according to an embodiment of the present invention.

A hydraulically damping engine bearing is shown in an unloaded state in FIG. 1. The engine bearing has attachment parts 1, 13 for installation of the bearing. An elastic circumferential wall 2 surrounds two chambers 3, 4 which are filled with a damping medium, such as hydraulic fluid. One of the two chambers 3, 4 is an upper chamber 3, and the other one of the two chambers is a lower chamber 4. A separating wall 5 separates the two chambers 3, 4 from each other. A throttle channel 6 is arranged within the separating wall 5 thereby connecting the two chambers 3, 4 to each other. A rigid bordering wall 10 is arranged within the engine bearing below and at a distance from the lower chamber 4. The lower chamber 4 functions as a compensation space and is sealed relative to the rigid bordering wall 10 by an elastic bordering wall 14.

The elements described above represent a conventional hydraulically damping engine bearing.

According to the present invention, an additional suspension spring 7 is connected in series to the elastic circumferential wall 2 so as to control the engine bearing. An annular sheet-metal reinforced part 15 is arranged at a housing part 16 of the engine bearing so as to hold the additional suspension spring 7 in place. An intermediate space 9 is delineated by the additional suspension spring 7 and the rigid bordering wall 10. A flow connection 12, in which a valve 8 is located, enables the intermediate space 9 to be connected to atmosphere.

The additional suspension spring 7 is limited on one side, in both axial and radial directions, by the rigid bordering wall 10. A stop 11 is configured in the engine bearing on the other side of the additional suspension spring 7. The stop 11 limits the additional suspension spring 7 on the other side, in both axial and radial directions, The position shown in FIG. 1 shows the engine bearing in a tensile state, whereby the additional suspension spring 7 strikes the stop 11.

In an embodiment of the present invention, the valve 8 is a non-return valve. The intermediate space 9 is therefore pumped empty by pumping movement of the engine bearing with the help of the valve 8, so that the additional suspension spring 7 comes to rest on the rigid bordering wall 10. In this state, the engine bearing is in the hard, high rigidity stage, because only the actual engine bearing is still active.

When the valve 8 is opened, the intermediate space 9 remains aerated. A soft low rigidity total spring rate occurs in the axial and radial directions due to the serial connection of the elastic circumferential wall 2 and the additional suspension spring 7.

A simple fail-safe function is attained when the valve 8 is a non-return valve that is externally controlled and opens only by external activation. Should the external activation fail, the non-return valve 8 becomes active, and air is pumped out of the intermediate space 9 by a pumping effect due to the engine bearing vibrations. As a result of the vacuum thus created, the additional suspension spring 7 comes to rest on the rigid bordering wall 10 and, only the actual engine bearing is active.

Figure 2:
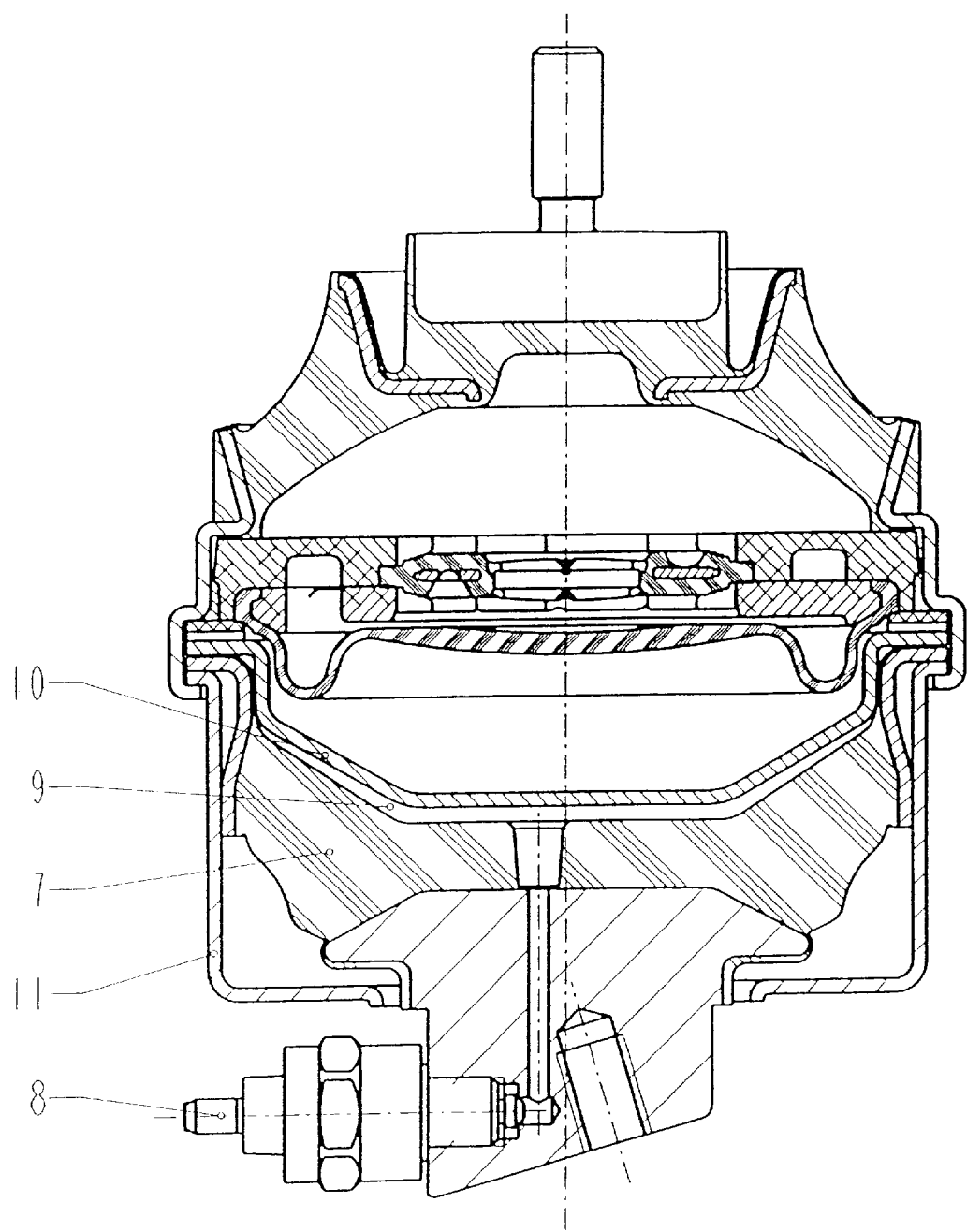
FIG. 2 shows a view of the engine bearing of FIG. 1, as installed.

FIG. 2 shows an embodiment of the present invention in which the engine bearing is in an installed state and under a static load. In this state, the additional suspension spring 7 is located between the stop 11 and the rigid bordering wall 10. During operation of the engine bearing, the additional suspension spring 7 moves axially between the stop 11 and the bordering wall 10. This movement of the additional suspension spring 7 empties the intermediate space 9 through the flow-unexposed valve 8, thereby implementing the hard stage of the engine bearing.

On the other hand, when the valve 8 is exposed to flow, i.e., when the non-return valve 8 is permanently open, the intermediate space 9 remains filled, and the additional suspension spring 7 does not come to rest on the bordering wall 10. Thus, the soft state of the engine bearing is established.

Due to the serial connection of the elastic circumferential wall 2 to the additional suspension spring 7, the spring constants of the individual elements are related to the total spring constant according to the formula:

$$1/C_{[total]} = 1/C_{bearing} + 1/C_{suspension\ spring}$$

The invention is not limited by the embodiments described above which are presented as examples only but can be modified in various ways within the scope of protection defined by the appended patent claims.

I claim:

1. A hydraulically damping engine bearing, comprising:
   a plurality of elastic walls arranged so as to at least partially border and define two fluid-filled chambers;
   a limitedly deflectable diaphragm arranged so as to separate the two chambers;
   at least one channel in communication between the fluid-filled chambers;
   means for adjusting a spring rate characteristic of the engine bearing, the spring rate adjusting means including a suspension spring arranged outside of one of the chambers, an intermediate space being defined by the suspension spring and a rigid bordering wall of the one of the chambers, and a valve arranged in communication with the intermediate space so as to enable the intermediate space to be aerated and de-aerated; and
   a stop arranged to face a side of the suspension spring opposite to the rigid bordering wall so as to prestress the suspension spring when the engine bearing is not loaded so that the suspension spring is positioned centrally between the stop and the rigid bordering wall when the engine bearing is under the influence of a static load.

2. The engine bearing in accordance with claim 1, wherein the suspension spring has a Shore hardness and each of the elastic walls of the chambers has a respective Shore hardness, the Shore hardness of the suspension spring being different from the respective Shore hardness of each of the elastic walls.

3. The engine bearing in accordance with claim 1, wherein the suspension spring is serially connected to the elastic walls and the diaphragm, so as to attain a frequency-independent reduction in the spring rate characteristic of the engine bearing.

4. The engine bearing in accordance with claim 1, wherein the stop is arranged so as to limit an axial deflection of the suspension spring in a direction towards the stop, the rigid bordering wall limiting the axial deflection of the suspension spring in a direction towards the rigid bordering wall.

5. The engine bearing in accordance with claim 4, wherein the stop is a cup-shaped element securely connected to the engine bearing.

6. The engine bearing in accordance with claim 1, wherein the valve is a non-return valve.

7. The engine bearing in accordance with claim 1, wherein the valve is externally controllable.

8. The engine bearing in accordance with claim 7, wherein the valve is a magnetic valve.

9. The engine bearing in accordance with claim 1, further comprising a flow connection between the valve and the intermediate space.

10. The engine bearing in accordance with claim 1, wherein the flow connection is arranged so as to run through the suspension spring.

11. The engine bearing in accordance with claim 1, wherein the spring rate characteristic of the engine bearing when the suspension spring is in contact with the rigid bordering wall is approximately equal to the spring rate characteristic of the engine bearing without the suspension spring.

* * * * *